United States Patent
Seyler et al.

(10) Patent No.: US 11,568,528 B2
(45) Date of Patent: Jan. 31, 2023

(54) METHOD AND APPARATUS FOR PRODUCING INFORMATION FROM A CAMERA IMAGE

(71) Applicant: Fraunhofer-Gesellschaft zur Förderung der angewandten Forschung e.V., Munich (DE)

(72) Inventors: Tobias Seyler, Freiburg (DE); Tobias Beckmann, Denzlingen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/155,134

(22) Filed: Jan. 22, 2021

(65) Prior Publication Data

US 2021/0233223 A1     Jul. 29, 2021

(30) Foreign Application Priority Data

Jan. 24, 2020   (EP) .................................... 20153587

(51) Int. Cl.
*G06T 7/00*     (2017.01)
*G03H 1/04*     (2006.01)
*H04N 5/232*    (2006.01)

(52) U.S. Cl.
CPC ......... *G06T 7/0002* (2013.01); *G03H 1/0443* (2013.01); *G03H 1/0465* (2013.01); *H04N 5/23229* (2013.01); *G03H 2222/13* (2013.01); *G03H 2240/11* (2013.01); *G06T 2207/20212* (2013.01); *G06T 2207/30168* (2013.01)

(58) Field of Classification Search
CPC ............... G03H 1/0443; G03H 1/0465; G03H 2222/13; G03H 2240/11; G06T 2207/20212; G06T 2207/30168; G06T 7/0002; G06T 2207/10016; H04N 5/23229

See application file for complete search history.

(56) References Cited

U.S. PATENT DOCUMENTS

| 7,038,787 B2 | 5/2006 | Price |
| 2013/0148182 A1* | 6/2013 | Yu ........................ G03H 1/0443 359/22 |

(Continued)

*Primary Examiner* — Dakshesh D Parikh
(74) *Attorney, Agent, or Firm* — Faegre Drinker Biddle & Reath LLP

(57) ABSTRACT

A method of producing information from at least one camera image of an object, including: A) recording raw image data of the at least one camera image, B) evaluating the raw image data by a mathematical linkage to produce combination image data, C) deriving the information from the combination image data, D) outputting the information, E) determining an actual measure for a data quality of the raw image data prior to or after evaluation steps in step B), F) determining a deviation between the actual measure for the data quality and a target measure for the data quality of the raw image data of at least one camera image, and G) again recording all raw image data of those camera images, for which the deviation determined in step F) is greater than a predetermined threshold value and repeating at least one evaluation step from step B) and steps C) to F) either until the deviation determined in step F) for the raw image data of all camera images from the plurality of camera images is less than the threshold value or until a predetermined termination condition is fulfilled.

10 Claims, 2 Drawing Sheets

(56) References Cited

U.S. PATENT DOCUMENTS

Figure 1:
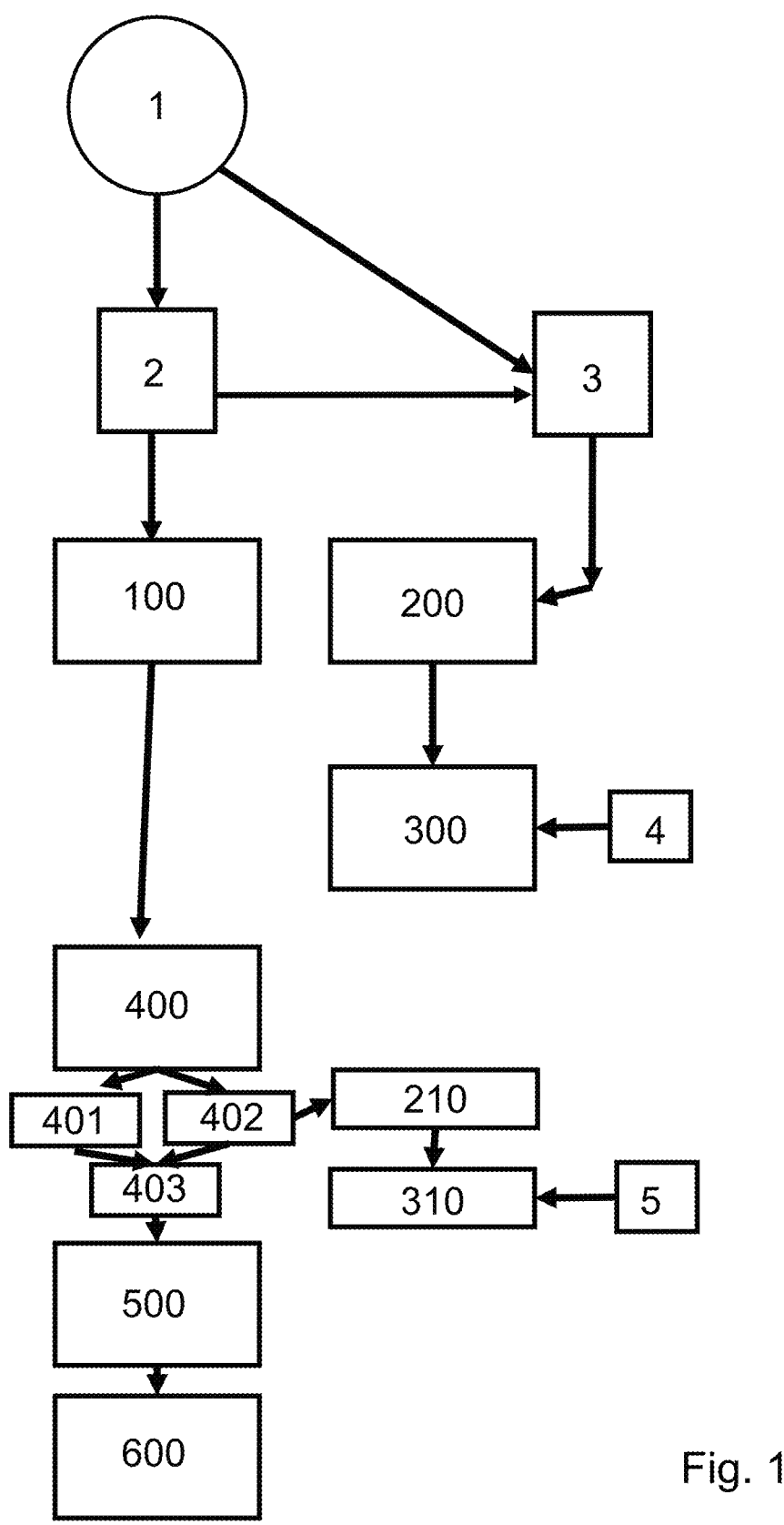

| | | | |
|---|---|---|---|
| 2015/0268628 A1* | 9/2015 | Sato | G01B 9/02091 |
| | | | 356/457 |
| 2017/0140144 A1* | 5/2017 | Bock | G06F 21/36 |

* cited by examiner

METHOD AND APPARATUS FOR PRODUCING INFORMATION FROM A CAMERA IMAGE

The priority application, European patent application no. 20 153 587.9, filed on Jan. 24, 2020, is incorporated by reference herein in its entirety.

The present invention concerns a method of producing information from at least one camera image of an object comprising the steps:

A) Recording raw image data of the at least one camera image,

B) Evaluating the raw image data of the at least one camera image in a plurality of evaluation steps, wherein in at least one of the plurality of evaluation steps the raw image data of the at least one camera image or image data derived from the raw image data of the at least one camera image are processed by means of a mathematical linkage with each other in such a way that combination image data are produced, C) Deriving the information from the combination image data, and D) Outputting the information.

The present invention also concerns an apparatus for carrying out such a method.

The evaluation of raw image data of a or a plurality of camera images is effected stepwise, wherein in dependence on the nature of the recording of the raw image data of the camera image in one or more evaluation steps the raw image data of one or more images are processed with a mathematical linkage so that combination image data are produced. In that case in the state of the art it is only after the information has been derived from the combination image data that it is possible to see whether the raw image data were or were not defective. In the case of a fault in the raw image data the recording of the raw image data of the at least one camera image then has to be repeated and the entire operation of evaluating the raw image data has to be carried out afresh. That involves superfluous computing effort and a serious time loss.

In comparison the object of the present invention is to provide a method of producing information from at least one camera image of an object, which can be carried out even with defective raw image data with reduced computing involvement. A further object of the present invention is to provide an apparatus for carrying out such a method.

According to the invention the above-mentioned object is attained by a method of producing information from at least one camera image of an object, wherein the method comprises the steps:

A) Recording raw image data of the at least one camera image,

B) Evaluating the raw image data of the at least one camera image in a plurality of evaluation steps, wherein in at least one of the plurality of evaluation steps the raw image data of the at least one camera image or image data derived from the raw image data of the at least one camera image are processed by means of a mathematical linkage with each other in such a way that combination image data are produced, C) Deriving the information from the combination image data, and D) Outputting the information, E) Determining an actual measure for a data quality of the raw image data of the at least one camera image prior to or after at least one of the plurality of evaluation steps in step B), F) Determining a deviation between the actual measure for the data quality and a target measure for the data quality of the raw image data of at least one camera image, and G) Again recording all raw image data of those camera images, for which the deviation determined in step F) is greater than a predetermined threshold value and again performing at least one evaluation step from step B) and steps C) to F) either until the deviation determined in step F) for the raw image data of all camera images from the plurality of camera images is less than the threshold value or until a predetermined termination condition is fulfilled.

The fundamental idea of the present invention is to determine the data quality of the raw image data of at least one camera image before the information is derived from the combination image data. In that way it is possible to save at least the step of deriving the information from the combination image data (step C)) if it turns out that the raw image data of the at least one camera image was not of a sufficiently high quality to obtain the information from the combination image data. In that respect in accordance with step G) those camera images, for which the deviation determined in step F) is greater than a predetermined threshold value are discarded, are then recorded afresh and the evaluation operation is carried out again until the deviation of the actual measure from the target measure for the data quality of the raw image data is less than the threshold value or until a termination condition is reached. That saves at least on computing involvement or computing time.

In an embodiment the termination condition is a predetermined maximum number of the renewed implementation of steps B) to F). That prevents the repetition procedure running at infinite length when the raw image data of at least one camera image are always worse than the predetermined threshold.

In evaluation of the raw image data of the at least one camera image in step B), in at least one evaluation step either the raw image data of the at least one camera image or image data derived from said raw image data are processed by a mathematical linkage with each other. In an embodiment of the invention that is effected by mathematical linkage of at least two elements of the raw image data of a single camera image. An example of such evaluation of the raw image data is the separation of two simultaneously coupled-in lasers in the frequency domain and then separate calculation of the recorded interference contrast. In that case in step B) first and second image data are derived from the raw image data of a single camera image, and are then processed by means of a mathematical linkage with each other so that the combination image data are produced. If the interference contrast for one of the two lasers is markedly lower it is then to be assumed that that laser is not operating in a stable state.

In an embodiment of the invention therefore in step A) the raw image data of precisely one camera image are recorded, and in step B) in at least one of the plurality of evaluation steps first image data derived from the raw image data of the precisely one camera image and second image data derived from the raw image data of the precisely one camera image are processed by means of a mathematical linkage with each other in such a way that the combination image data are produced.

In an embodiment of the invention in which in step A) the raw image data of precisely one camera image are recorded the actual measure for the data quality of the raw image data is determined before the evaluation step in step B), in which the derived image data are processed by means of a mathematical linkage. In that way in the situation where the operation of determining the deviation in step F) shows that the data quality of the raw image data was not sufficient the evaluation step with the mathematical linkage can be cut and recording of the raw image data can be repeated with the subsequent evaluation in steps A) and B). In addition in an embodiment it is possible to dispense with a time-consuming transmission of the raw image data from a camera computer to a processing computer.

In an embodiment of the invention in step A) the raw image data of a plurality of camera images are recorded and in step B) in at least one of the plurality of evaluation steps either the raw image data of a first of the plurality of camera images or image data derived from the raw image data of the first camera image and either the raw image data of a second of the plurality of camera images or image data derived from the raw image data of the second camera image are processed by means of a mathematical linkage in such a way that the combination image data are produced.

In an embodiment of the invention the raw image data of the plurality of camera images are recorded in time succession.

Depending on the respective measurement methods steps E) and F) are carried out at least
- after step A) and before step B), or
- after one of the plurality of evaluation steps in step B), wherein the actual measure for the data quality of the raw image data is determined in step E) on the basis of the image data derived from the raw image data, or
- after step B) and before step C), wherein the actual measure for the data quality of the raw image data in step E) is determined on the basis of the combination image data, or
- in step C), wherein the actual measure for the data quality of the raw image data in step E) is determined on the basis of a combination of a plurality of combination data.

While the advantages of the present invention can already be enjoyed when steps E) to G) are carried out at least once after recording of the raw image data in step A), in an embodiment of the invention steps E) to G) are carried out a plurality of times and at different points in the method. In the latter case then different criteria serve as a measure in respect of the data quality of the raw image data.

As the measure in respect of the data quality of the raw image data it is possible to consider direct criteria like for example an environmental condition during recording of the raw image data, but also indirect criteria like for example an image property of the raw image data or the image data derived from the raw image data.

In an embodiment of the invention during recording of the raw image data in step A) an environmental condition is detected by means of a measurement variable, wherein the measurement variable is the actual measure for the data quality and a predetermined value for the measurement variable forms the target measure for the data quality. In that respect the term environmental condition is used to mean a condition in the surroundings of a camera, with which the raw image data are detected, and/or of the object.

In an embodiment of the invention the measurement variable is selected from a group comprising a vibration of the object and/or a camera for detecting the object, a relative movement between the object and the camera, an acoustic pressure, a brightness, a temperature and an air movement between the camera and the object or a combination thereof. The environmental conditions of camera and/or object have a direct influence on the data quality of the raw image data.

If the recording of the raw image data is influenced or disturbed by an environmental condition then the data quality of the raw image data changes. At least the data quality of the raw image data is reduced by a change in the environmental condition. A plausible example of that is shaking of the camera while carrying out step A), that is to say recording the raw image data. If the camera vibrates excessively greatly then the raw image data will be "blurred". If now the environmental condition is detected during recording of all raw image data of a plurality of camera images then it is already possible immediately after the performance of step A) to discard those camera images, the data quality of which is highly probable not to be adequate. Only those discarded camera images then have to be recorded afresh.

It is however also possible additionally or alternatively to determine the actual measure for the data quality of the raw image data from the raw image data themselves or from image data of a camera image, derived from the raw image data.

Therefore in an embodiment of the invention the actual measure for the data quality of the raw image data is selected from a group comprising an average brightness of the raw image data or the derived image data of a camera image, the contrast of the raw image data or the derived image data of a camera image, a correlation of the raw image data or the derived image data of two different camera images of the same object, a change in the brightness or the contrast between the raw image data and the derived image data of two different camera images of the same object or any combination thereof.

In an embodiment of the invention steps E) and F) are performed after step A) and before step B) on a camera computer and wherein before step B) the raw image data are transmitted by the camera computer to a processing computer and the evaluation steps of step B) are carried out on the processing computer. Such an embodiment is desirable because it performs a first check on the data quality prior to the time-consuming transmission of the raw image data from the camera computer to the processing computer. In an embodiment the camera computer and the processing computer are two mutually separate processors of the same computer.

In a further embodiment steps E) and F) are carried out on the camera computer, wherein a first evaluation step of step B) is carried out on the camera computer and a second evaluation step of step B) is carried out on the processing computer and wherein the derived image data after the first evaluation step and before the second evaluation step are transmitted by the camera computer to the processing computer. In such an embodiment also at least one first evaluation step of step B) is still carried out on the camera computer before the derived image data are transmitted to the processing computer. In this case also a first check on the data quality on the camera computer provides that the data quality is checked prior to the time-consuming transmission of the image data derived from the raw image data from the camera computer to the processing computer. In the situation where the raw image data of one or more camera images have to be discarded and re-recorded that gives a considerable saving in terms of processing time.

In an embodiment of the invention the method is an interferometric or holographic method and the method includes the step illuminating the object with electromagnetic radiation with precisely one discrete wavelength or a plurality of discrete wavelengths, wherein the combination image data represent an interferometric or holographic image and the produced information includes a spatial phase distribution of the electromagnetic radiation of precisely one respective wavelength, that is at least reflected or scattered by the object.

An example of measurement methods which are always based on the mathematical linkage of raw image data or image data derived from the raw image data by means of a mathematical linkage with each other so that combination image data are produced are all interferometric or holographic methods.

A simple interferogram or hologram generates from the raw data of one or more camera images of a wavelength a preferably complex-valued spatial phase distribution as combination image data in the sense of the present application.

It will be appreciated that in an embodiment processing time and computing time can be reduced if all camera images which are mathematically linked to give the combination image data are of sufficient data quality in respect of theft raw image data before the computing-intensive mathematical linkage is effected.

By way of an interferometric or holographic method in which the phase distribution of a single wavelength is considered the method according to the invention can also advantageously be used for difference holography or multi-wavelength holography. In that case a spatial distribution of the phase position of a synthetic wavelength (synthetic phase) formed by the difference of two discrete wavelengths, of the electromagnetic radiation reflected or scattered by the object, with a plurality of discrete wavelengths, is considered. In an embodiment of the invention therefore the method is a holographic method and the method includes the steps of illuminating the object with electromagnetic radiation with a plurality of discrete wavelengths, wherein the combination data represent a holographic image and the information produced contains a spatial distribution of a synthetic phase of the magnetic radiation at least reflected or scattered by the object, with the plurality of discrete wavelengths.

In that respect in an embodiment of the invention the actual measure for the data quality of the raw image data is selected from a group which comprises parameters of a phase shift operation on the combination data, a correlation between the combination data of the object and the combination data of a reference object, an average amplitude of the combination data, and a contrast of a known structure of the object in the combination data. Expressed in other words the combination data representing the holographic image can be used for determining the actual measure for the data quality of the raw image data.

In an embodiment of the invention in step A) for the plurality of discrete wavelengths a respective plurality of raw image data of a plurality of camera images is recorded, wherein in step B) for each of the plurality of discrete wavelengths combination image data in the form of a hologram are produced and wherein in step C) a difference hologram is produced from the combination image data of the plurality of discrete wavelengths.

In an embodiment of the invention in step C) a height map of a surface of the object is calculated as information from the plurality of difference holograms.

In an embodiment of the invention the actual measure for the data quality of the raw image data is selected from a group which comprises a phase noise in at least one difference hologram over a selected portion of the object, a phase noise in at least one difference hologram over a portion of a reference body of known form, a correlation between the phase noise in the difference holograms of a portion of the object and a portion of the reference body, a correlation between an amplitude in the difference hologram of the object and an amplitude in the difference hologram of a reference body, a tilting of the spatial distribution of the synthetic phase of the electromagnetic radiation which is at least reflected or scattered by the object during a first selection of wavelengths from the plurality of discrete wavelengths and the spatial distribution of the synthetic phase of the electromagnetic radiation which is at least reflected or scattered by the object with a second selection of wavelengths from the plurality of discrete wavelengths, a comparison of a shape recorded with a first synthetic wavelength of a surface portion of the object and the shape recorded with a second synthetic wavelength of the same surface portion of the object.

The above-mentioned object is also attained by an apparatus for producing information from at least one camera image of an object, wherein the apparatus has a camera, wherein the camera is adapted such that in operation of the apparatus the camera carries out the step A) recording raw image data of at least one camera image, and an evaluation device, wherein the evaluation device is so connected to the camera that in operation of the apparatus the evaluation device obtains the raw image data of the at least one camera image or image data derived from the raw image data of the at least one camera image, wherein at least the camera or the evaluation device is so designed and adapted that at least the camera or the evaluation device in operation of the apparatus carries out the following steps B) Evaluating the raw image data of the at least one camera image in a plurality of evaluation steps, wherein in at least one of the plurality of evaluation steps the raw image date of the at least one camera image or image data derived from the raw image data of the at least one camera image are processed by means of a mathematical linkage with each other in such a way that combination image data are produced, C) Deriving the information from the combination image data, D) Outputting the information, E) Determining an actual measure for a data quality of the raw image data of at least one camera image prior to or after at least one of the plurality of evaluation steps in step B), F) Determining a deviation between the actual measure for the data quality and a target measure for the data quality of the raw image data of at least one camera image, and G) Again recording all raw image data of those camera images, for which the deviation determined in step F) is greater than a predetermined threshold value and again performing at least one evaluation step from step B) and steps C) to F) either until the deviation determined in step F) for the raw image data of all camera images from the plurality of camera images is less than the threshold value or until a predetermined termination condition is fulfilled.

Insofar as aspects of the invention were described hereinbefore in relation to the method of producing information from at least one camera image of an object they also apply in terms of the apparatus for producing information from at least one camera image of an object. In particular the apparatus according to the invention is suitable for carrying out the method according to the invention and its embodiments. Insofar as an embodiment of the invention is carried out with an embodiment of the apparatus according to this invention then the apparatus has the corresponding devices for that purpose or the camera and/or the evaluation device are so designed and adapted that in operation of the apparatus they carry out the corresponding method steps. The alphabetical listing of the method steps in the description of the method is the same as in the description of the apparatus.

Further advantages, features and possible uses of the present invention are apparent from the description hereinafter of embodiments and the associated Figures. In the Figures identical components are denoted by the same references.

Figure 2:
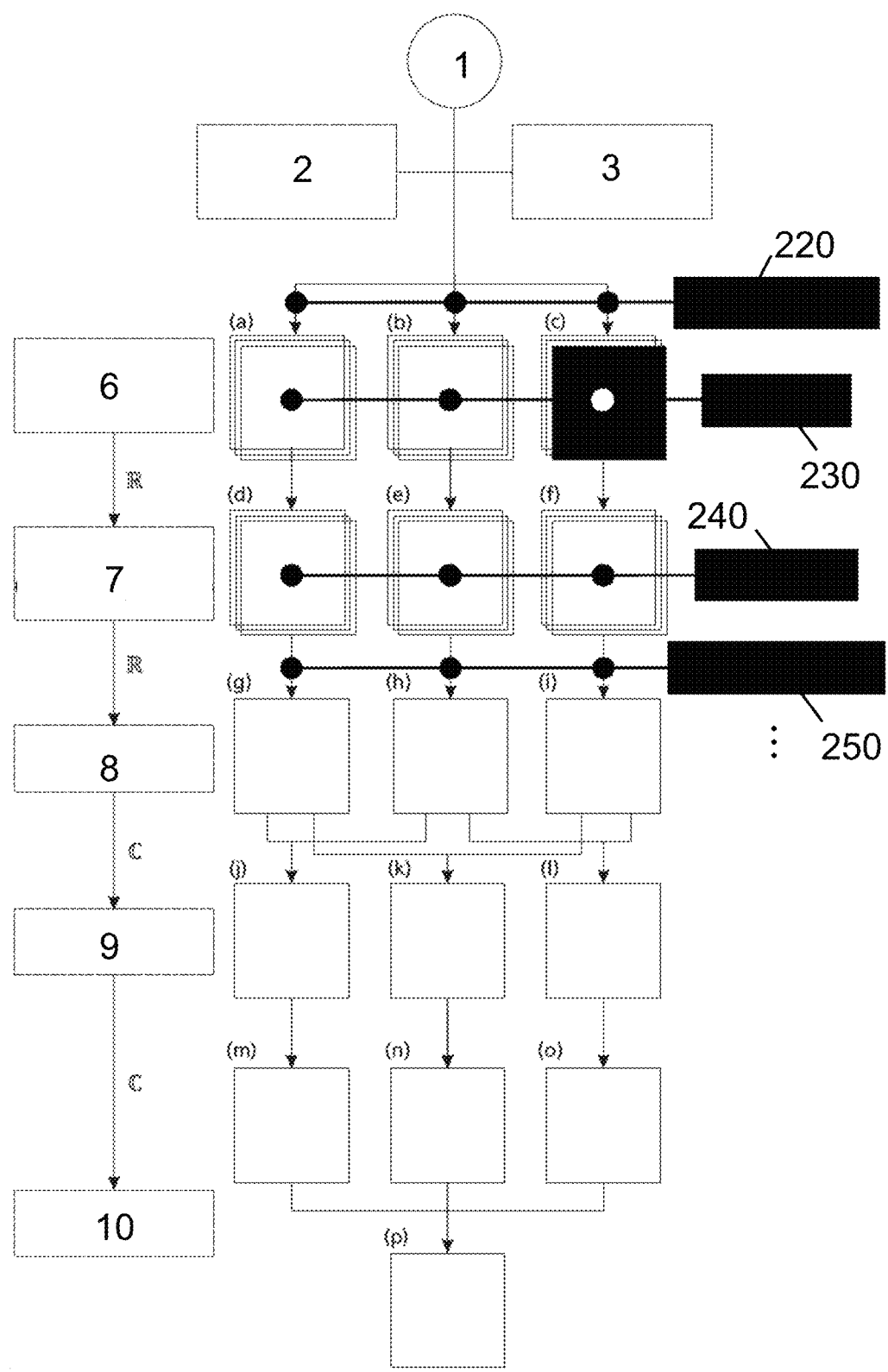

FIG. 1 shows a diagrammatic flow chart of an embodiment of the method according to the invention for producing information from at least one camera image of an object, and FIG. 2 is a diagrammatic flow chart of a further embodiment of the method according to the invention, wherein a height map of the object is produced with the method by means of a difference hologram.

FIG. 1 shows a flow chart of an embodiment of the method according to the invention in which in step 100 the raw image data of precisely one camera image of an object 1 are recorded with a camera 2.

At the same time as recording of the raw image data in step 200 shaking of the camera 2 and the object 1 is detected by means of an acceleration sensor 3. The detected shaking serves as an actual measure in respect of the data quality of the raw image data of the camera image. The actual measure detected in step 200 in respect of the data quality of the raw image data is then compared in step 300 to a predetermined threshold value 4 as the target measure in respect of the data quality. If a deviation between the actual measure and the target measure in respect of the data quality is greater than the threshold value 4 then the raw image data of the camera image of the object 1 are discarded and detected afresh by means of the camera 2 in step 100.

Otherwise the raw image data are evaluated in a step 400, wherein step 400 in the illustrated embodiment includes three evaluation steps 401, 402, 403. In steps 401 and 402 various image data are derived from the raw image data of a single camera image, the different image data being mathematical linked together in the step 403 so that combination image data are produced. After steps 401, 402 checking of the data quality of the raw image data is effected again. For that purpose in step 210 an indirect measure in respect of the data quality in the form of the contrast of the image data of the camera image, derived in steps 401, 402, is determined. That actual measure is compared again for the data quality of the raw image data in step 310 with a predetermined threshold value 5. If the deviation between the actual measure and the target measure in respect of the data quality exceeds the predetermined threshold value 5 the image data are discarded and the raw image data of the object 1 are again detected with the camera 2.

It is only if both checks 200, 210 and 300, 310 in respect of the data quality of the raw image data were positive that the derived image data are linked together to give combination image data in step 403. In addition in step 500 the information is derived from the combination image data and in step 600 the information is output. An example of a method in accordance with the procedure in FIG. 1 is a method of producing a holographic image, wherein first and second image data are derived from the raw image data of a single hologram in steps 401 and 402 and in step 403 they are mathematically linked together to produce the combination image data.

FIG. 2 diagrammatically shows a further embodiment of the method according to the invention in which the raw image data of a plurality of camera images of the object 1 are detected with the camera 2. The Figure shows the sequence of a numerical reconstruction for the case of a hologram with three discrete wavelengths (a), (b) and (c). Three phase steps are detected for each of the three wavelengths, that is to say the raw image data of three respective camera images. Therefore 3×3 sets of raw image data of the camera images are to be evaluated.

Simultaneously with recording of the camera images the acceleration sensor 3 detects shaking of the camera 2 and/or the object 1. A first check in respect of the data quality of the raw image data, that is to say determining an actual measure in respect of the data quality of the raw image data and determining a deviation between the actual measure and a target measure for the data quality, is effected in step 220 while still in a camera computer 6 before transmission of the raw image data to a processing computer 7. If it is established that the camera 2 and/or the object 1 were shaken excessively during the recording of raw image data of a camera image then the corresponding raw image data of the camera image are discarded and only the discarded camera images are recorded afresh.

A second assessment of the data quality of the raw image data is effected in step 230 while also still in the camera computer 6, on the basis of the average intensity of the raw image data of the individual camera images. It is to be noted that the third image is markedly darker for the third wavelength (c). That image therefore has to be discarded and recorded afresh with an adjusted exposure time for the camera 2 or an increased intensity of the illuminating laser. Only raw image data of camera images which have successfully passed the first two checks 220, 230 in respect of the data quality of the raw image data are transmitted from the camera computer 6 to the processing computer 7. In that way time is saved in data transmission from the camera computer to the processing computer. Otherwise the transmission would also have to be repeated for those raw data of camera images, the data quality of which is not adequate.

After transmission into the memory of the processing computer 7 more complex computations are carried out in the evaluation steps. In parallel with processing of the image data the data quality of the raw image data are checked again and again on the basis of criteria or measures which were not yet accessible in the preceding processing states of the image data.

In step 240 the mean modulation for each wavelength is calculated for example by cyclic subtraction of the individual camera images. The mean modulation decreases if shaking during recording of the camera images has an effect on the camera 2 or the object 1 as the interference contrast is reduced. Here too a measure can again be defined for the data quality of the raw image data, which, if it is not fulfilled, leads to discarding of the corresponding camera image and renewed recording of the raw image data of that image.

In the next step the three individual camera images of each wavelength are applied to form a hologram 8, wherein three difference holograms with a synthetic wavelength are generated from the three holographic images in the next step. Finally a height map 10 of the surface of the object 1 is produced from those difference holograms.

It will be appreciated that before or after each processing step a further indirect measure for the data quality of the underlying raw image data can be defined, determine the actual measure and compared to a target measure so that in each processing step criteria for the discarding of one or more camera images can be produced. By way of example during the phase shift in the generation of the hologram 8 in step 250 criteria for the phase steps are defined, which serve as a measure in respect of the data quality of the raw image data.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

The invention claimed is:

1. A holographic method of producing information from at least one camera image of an object comprising the steps:
   A) Illuminating the object with electromagnetic radiation with a plurality of discrete wavelengths,
   B) Recording raw image data of the at least one camera image,
   C) During recording of the raw image data in step B), detecting an environmental condition by a measurement variable,
      wherein the measurement variable is at least one selected from a group consisting of a vibration of the object or a camera for detecting the object, a relative movement between the object and the camera, an acoustic pressure, a brightness, a temperature, and an air movement between the camera and the object,
   D) Evaluating the raw image data of the at least one camera image in a plurality of evaluation steps,
      wherein in at least one of the plurality of evaluation steps the raw image data of the at least one camera image or image data derived from the raw image data of the at least one camera image are processed by a mathematical linkage with each other in such a way that combination image data are produced, and
      wherein the combination image data represents a holographic image and the produced information contains a spatial distribution of a synthetic phase of the electromagnetic radiation with the plurality of discrete wavelengths, that is at least reflected or scattered by the object,
   E) Deriving the information from the combination image data,
   F) Outputting the information,
   G) Determining first actual measure for a data quality of the raw image data of at least one camera image prior to or after at least one of the plurality of evaluation steps in step D),
      wherein the measurement variable is the first actual measure for the data quality and a predetermined value for the measurement variable forms the target measure for the data quality,
   H) Determining a second actual measure for the data quality of the raw image data of at least camera image after at least one of the plurality of evaluation steps in step D),
      wherein the second actual measure for the data quality of the raw image data is selected from a group consisting of parameters of a phase shift operation of the combination data, a correlation between the combination data of the object and the combination data of a reference object, an average amplitude of the combination data, and a contrast of a known structure of the object in the combination data,
   I) Determining a first deviation between the first actual measure for the data quality and a first target measure for the data quality of the raw image data of at least one camera image,
   J) Determining a second deviation between the second actual measure for the data quality and a second target measure for the data quality of the raw image data of at least one camera image, and
   K) Again recording all raw image data of those camera images, for which the first deviation determined in step I) is greater than a first predetermined threshold value or the second deviation determined in step J) is greater than a second predetermined threshold value and again performing at least one evaluation step from step D) and steps G) to J) either until the first deviation determined in step I) for the raw image data of all camera images from the plurality of camera images is less than the threshold value and the second deviation determined in step J) for the image data of all camera images from the plurality of camera images is less than the second threshold value or until a predetermined termination condition is fulfilled.

2. The method according to claim 1,
   wherein in step B) the raw image data of precisely one camera image are recorded, and
   wherein in step D) in at least one of the plurality of evaluation steps first image data derived from the raw image data of the precisely one camera image and second image data derived from the raw image data of the precisely one camera image are processed by a mathematical linkage with each other in such a way that the combination image data are produced.

3. The method according to claim 1,
   wherein in step B) the raw image data of a plurality of camera images are recorded and
   wherein in step D) in at least one of the plurality of evaluation steps either the raw image data of a first of the plurality of camera images or image data derived from the raw image data of the first camera image and either the raw image data of a second of the plurality of camera images or image data derived from the raw image data of the second camera image are processed by a mathematical linkage in such a way that the combination image data are produced.

4. The method according to claim 1, wherein steps G) and I) are performed at least
   after step B) and before step D), or
   after one of the plurality of evaluation steps in step D), wherein the first actual measure for the data quality of the raw image data is determined in step G) on the basis of the derived image data, or after step D) and before step E), wherein the first actual measure for the data quality of the raw image data in step G) is determined on the basis of the combination image data, or in step E), wherein the first actual measure for the data quality of the raw image data in step G) is determined on the basis of a combination of a plurality of combination data.

5. The method according to claim 1, wherein the first actual measure for the data quality of the raw image data is at least one selected from a group consisting of an average brightness of the raw image data or the derived image data of a camera image, the contrast of the raw image data or the derived image data of a camera image, a correlation of the raw image data or the derived image data of two different camera images of the same object, and a change in the brightness or the contrast between the raw image data and the derived image data of two different camera images of the same object.

6. The method according to claim 1, wherein either steps G) and I) are performed after step B) and before step D) on a camera computer and wherein before step D) the raw image data are transmitted by the camera computer to a processing computer and the evaluation steps of step D) are carried out on the processing computer, or steps G) and I) are carried out on the camera computer, wherein a first evaluation step of step D) is carried out on the camera computer and a second evaluation step of step D) is carried out on the processing computer and wherein the derived image data after the first evaluation step and before the second evaluation step are transmitted by the camera computer to the processing computer.

7. The method according to claim 1, wherein in step B) for the plurality of discrete wavelengths a respective plurality of raw image data of a plurality of camera images is recorded, wherein in step D for each of the plurality of discrete wavelengths combination image data in the form of a hologram are produced and wherein in step E) a difference hologram is produced from the combination image data of the plurality of discrete wavelengths.

8. The method according to claim 7, wherein in step E) a height map of a surface of the object is calculated as information from the plurality of difference holograms.

9. The method according to claim 1, wherein the actual measure for the data quality of the raw image data is at least one selected from a group consisting of a phase noise in at least one difference hologram over a selected portion of the object, a phase noise in at least one difference hologram over a portion of a reference body of known form, a correlation between the phase noise in the difference holograms of a portion of the object and a portion of the reference body, a correlation between an amplitude in the difference hologram of the object and an amplitude in the difference hologram of a reference body, a tilting of the spatial distributions of the synthetic phase of the electromagnetic radiation which is at least reflected or scattered by the object with a first selection of wavelengths from the plurality of discrete wavelengths and the spatial distributions of the synthetic phase of the electromagnetic radiation which is at least reflected or scattered by the object with a second selection of wavelengths from the plurality of discrete wavelengths, and a comparison of a shape recorded with a first synthetic wavelength of a surface portion of the object and the shape recorded with a second synthetic wavelength of the same surface portion of the object.

10. An apparatus for producing information from at least one camera image of an object comprising a camera and an evaluation device, wherein the camera is adapted such that in operation of the apparatus the camera carries out the following steps A) Illuminating the object with electromagnetic radiation with a plurality of discrete wavelengths, B) recording raw image data of at least one camera image, and C) during recording of the raw image in step B), detecting an environmental condition by a measurement variable, wherein the measurement variable is at least one selected from the group consisting of a vibration of the object or a camera for detecting the object, a relative movement between the object and the camera, an acoustic pressure, a brightness, a temperature and an air movement between the camera and the object, wherein the evaluation device is so connected to the camera that in operation of the apparatus the evaluation device obtains the raw image data of the at least one camera image or image data derived from the raw image data of the at least one camera image, wherein at least the camera or the evaluation device is so designed and adapted that at least the camera or the evaluation device in operation of the apparatus carries out the following steps D) Evaluating the raw image data of the at least one camera image in a plurality of evaluation steps, wherein in at least one of the plurality of evaluation steps the raw image date of the at least one camera image or the image data derived from the raw image data of the at least one camera image are processed by a mathematical linkage with each other in such a way that combination image data are produced, wherein the combination image data represent a holographic image and the produced information contains a spatial distribution of a synthetic phase of the electromagnetic radiation with the plurality of discrete wavelengths, that is at least reflected or scattered by the object, E) Deriving the information from the combination image data, and F) Outputting the information, G) Determining first actual measure for a data quality of the raw image data of at least one camera image prior to or after at least one of the plurality of evaluation steps in step D), wherein the measurement variable is the first actual measure for the data quality and a predetermined value for the measurement variable forms the target measure for the data quality, H) Determining second actual measure for the data quality of the raw image data of at least one camera image after at least one of the plurality of evaluation steps in step D), wherein the second actual measure for the data quality of the first raw image data is at least one selected from the group consisting of parameters of a phase shift operation on the combination data, a correlation between the combination data of the object and the combination data of a reference object, an average amplitude of the combination data, and a contrast of a known structure of the object in the combination data, I) Determining a first deviation between the first actual measure for the data quality and a first target measure for the data quality of the raw image data of at least one camera image,
J) Determining a second deviation between the second actual measure for the data quality and a second target measure for the data quality of the raw image data of at least one camera image, and
K) Again recording all raw image data of those camera images, for which the first deviation determined in step I) is greater than a predetermined threshold value or the second deviation determined in step J) is greater than a second predetermined threshold value and again performing at least one evaluation step from step D) and steps G) to J) either until the first deviation determined in step I) for the raw image data of all camera images from the plurality of camera images is less than the threshold value and the second deviation determined in step J) for the raw image data of all camera images from the plurality of camera images is less than the second threshold value or until a predetermined termination condition is fulfilled.

\* \* \* \* \*